(12) United States Patent
Griffin et al.

(10) Patent No.: US 12,463,894 B2
(45) Date of Patent: Nov. 4, 2025

(54) SUPERDENSE FAILOVER FOR SPECIFIC SERVICES ON A QUANTUM CHANNEL

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 259 days.

(21) Appl. No.: 17/993,548

(22) Filed: Nov. 23, 2022

(65) Prior Publication Data

US 2024/0171467 A1    May 23, 2024

(51) Int. Cl.
*H04L 45/24* (2022.01)
*H04L 41/0896* (2022.01)
*H04L 45/00* (2022.01)

(52) U.S. Cl.
CPC .......... *H04L 45/24* (2013.01); *H04L 41/0896* (2013.01); *H04L 45/22* (2013.01)

(58) Field of Classification Search
CPC . H04L 41/0896; H04L 41/0803; H04L 45/22; H04L 45/24; H04L 47/10; H04L 47/29
See application file for complete search history.

(56) References Cited

U.S. PATENT DOCUMENTS

| | | | |
|---|---|---|---|
| 8,983,303 B2 | 3/2015 | Meyers et al. | |
| 9,774,401 B1 | 9/2017 | Borrill | |
| 10,756,826 B1 | 8/2020 | Coady et al. | |
| 11,133,823 B2 | 9/2021 | Griffin et al. | |
| 11,360,924 B1 | 6/2022 | Griffin et al. | |
| 2021/0176055 A1* | 6/2021 | Rahman | H04L 9/0855 |
| 2021/0273792 A1* | 9/2021 | Coady | H04L 9/0819 |
| 2022/0269976 A1* | 8/2022 | Wang | G06N 10/00 |
| 2022/0303129 A1* | 9/2022 | Rahman | H04L 9/0819 |
| 2024/0031224 A1* | 1/2024 | Stockert | H04L 41/0823 |
| 2024/0078457 A1* | 3/2024 | Stockert | H04L 41/12 |

OTHER PUBLICATIONS

Herbert, S. (Jun. 23, 2020). Increasing the classical data throughput in quantum networks by combining quantum linear network coding with superdense coding</i>. Physical Review. https://journals.aps.org/pra/pdf/10.1103/PhysRevA.101.062332 (Year: 2020).*
Liu, Qin, et al., "Quantum parallel teleportation of multi-qudit state via different paths," Quantum Information, https://link.springer.com/article/10.1140/epjd/s10053-021-00210-8, Jul. 8, 2021, 13 pages.
Rietsche, Roman, et al., "Quantum computing," Electronic Markets, https://doi.org/10.1007/s12525-022-00570-y, Aug. 5, 2022, 12 pages.
Wu, Xiaoliang, et al., "A Scalable Quantum Key Distribution Network Testbed Using Parallel Discrete-Event Simulation," ACM Trans. Model. Comput. Simul. 32, 2, Article 11, https://doi.org/10.1145/3490029, Feb. 2022, 22 pages.

\* cited by examiner

*Primary Examiner* — Boris D Grijalva Lobos
(74) *Attorney, Agent, or Firm* — Dority & Manning, P.A.

(57) ABSTRACT

A communication packet is received from a service. It is determined, based on network configuration data associated with the service, to communicate at least a portion of the communication packet over a quantum network with a superdense protocol in lieu of a default communication protocol. The portion is encoded according to the superdense protocol using a first qubit entangled with a second qubit accessible by the recipient interface. The first qubit is transmitted over the quantum network to the recipient interface.

20 Claims, 5 Drawing Sheets

SUPERDENSE FAILOVER FOR SPECIFIC SERVICES ON A QUANTUM CHANNEL

BACKGROUND

Quantum computing involves the use of quantum bits, referred to herein as "qubits," which have characteristics that differ from those of classical (e.g., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit may not be described independently of the state of the other qubit.

SUMMARY

The examples disclosed herein relate to a quantum computing networking architecture for adaptively implementing superdense encoding of communication packets based on a configuration for a service associated with the packets. In one example, an example method includes receiving, by a quantum computing system including a processor device, a communication packet from a service. The example method includes determining, by the quantum computing system and based on network configuration data associated with the service, to communicate at least a portion of the communication packet over a quantum network with a superdense protocol in lieu of a default communication protocol. The example method includes encoding, by the quantum computing system, the portion according to the superdense protocol using a first qubit entangled with a second qubit accessible by the recipient interface. The example method includes transmitting, by the quantum computing system, the first qubit over the quantum network to the recipient interface.

In another example, an example quantum computing system includes a memory and a processor device coupled to the memory to receive a communication packet from a first service. The example quantum computing system includes the processor device coupled to the memory to determine, based on network configuration data associated with the first service, to communicate at least a portion of the communication packet over a quantum network with a superdense protocol in lieu of a default communication protocol. The example quantum computing system includes the processor device coupled to the memory to encode the portion according to the superdense protocol using a first qubit entangled with a second qubit accessible by the recipient interface. The example quantum computing system includes the processor device coupled to the memory to transmit the first qubit over the quantum network to the recipient interface.

In another example, an example non-transitory computer-readable storage medium includes executable instructions to cause a quantum computing system to receive a communication packet from a first service. The example non-transitory computer-readable storage medium includes executable instructions to cause the quantum computing system to determine, based on network configuration data associated with the first service, to communicate at least a portion of the communication packet over a quantum network with a superdense protocol in lieu of a default communication protocol. The example non-transitory computer-readable storage medium includes executable instructions to cause the quantum computing system to encode the portion according to the superdense protocol using a first qubit entangled with a second qubit accessible by the recipient interface. The example non-transitory computer-readable storage medium includes executable instructions to cause the quantum computing system to transmit the first qubit over the quantum network to the recipient interface.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context.

Finally, it is noted that while, for purposes of illustration and simplicity, the certain aspects are illustrated as being implemented by a quantum computing system that comprises a quantum computing device that in turn comprises a single quantum processor device, in practice the examples/implementations disclosed herein may be implemented in a quantum computing system that comprises any number of quantum computing devices, each of which may comprise one or more quantum processor devices. Thus, irrespective of the implementation, the examples/implementations may be implemented on a computer system that includes one or more quantum computing devices, wherein the one or more quantum computing devices comprise one or more quantum processor devices, and the one or more quantum processor devices implement functionality disclosed herein.

Quantum computing networking systems can communicate data over quantum network links. Connected computing systems can execute services that transmit data using the quantum computing networking systems. Data from the services can be encoded in qubits. Qubits can be transmitted over the quantum network links to communicate the data encoded in the qubits to a recipient system.

In some examples, quantum networking links can have limited bandwidth. Bandwidth can be limited by, for example, available qubits for transmission, available network links for utilization, processing power, etc. In some situations, superdense encoding has been used to decrease a bandwidth budget for communication of a given packet size. For instance, superdense encoding can leverage entangled qubits accessible by a recipient to communicate half as many qubits as in a non-superdense protocol. For instance, given a pair of qubits in a Bell state. One of the paired qubits can encode data and be transmitted to a recipient who has access to the other paired qubit. A predetermined entanglement between the pairing can be used to infer complementary information regarding the other entangled qubit in addition to the received transmitted qubit. But superdense coding can be expensive to implement.

Advantageously, examples according to the present disclosure can provide for adaptive implementation of superdense encoding based on service-based configuration schema. Services can be associated with corresponding configuration parameters for instructing the quantum computing networking system to implement superdense encoding. Configuration parameters can include bandwidth threshold triggers, priority flags, etc. Based on the associated configuration parameters, example quantum computing networking systems can selectively trigger superdense encoding for communication packets to and from a given service. Example quantum computing networking systems can optionally communicate with superdense encoding for communications for that service in parallel with non-superdense encoding for communications for other services.

Example implementations are discussed herein in more detail with reference to the Figures by way of example only for the purposes of illustration.

Figure 1:
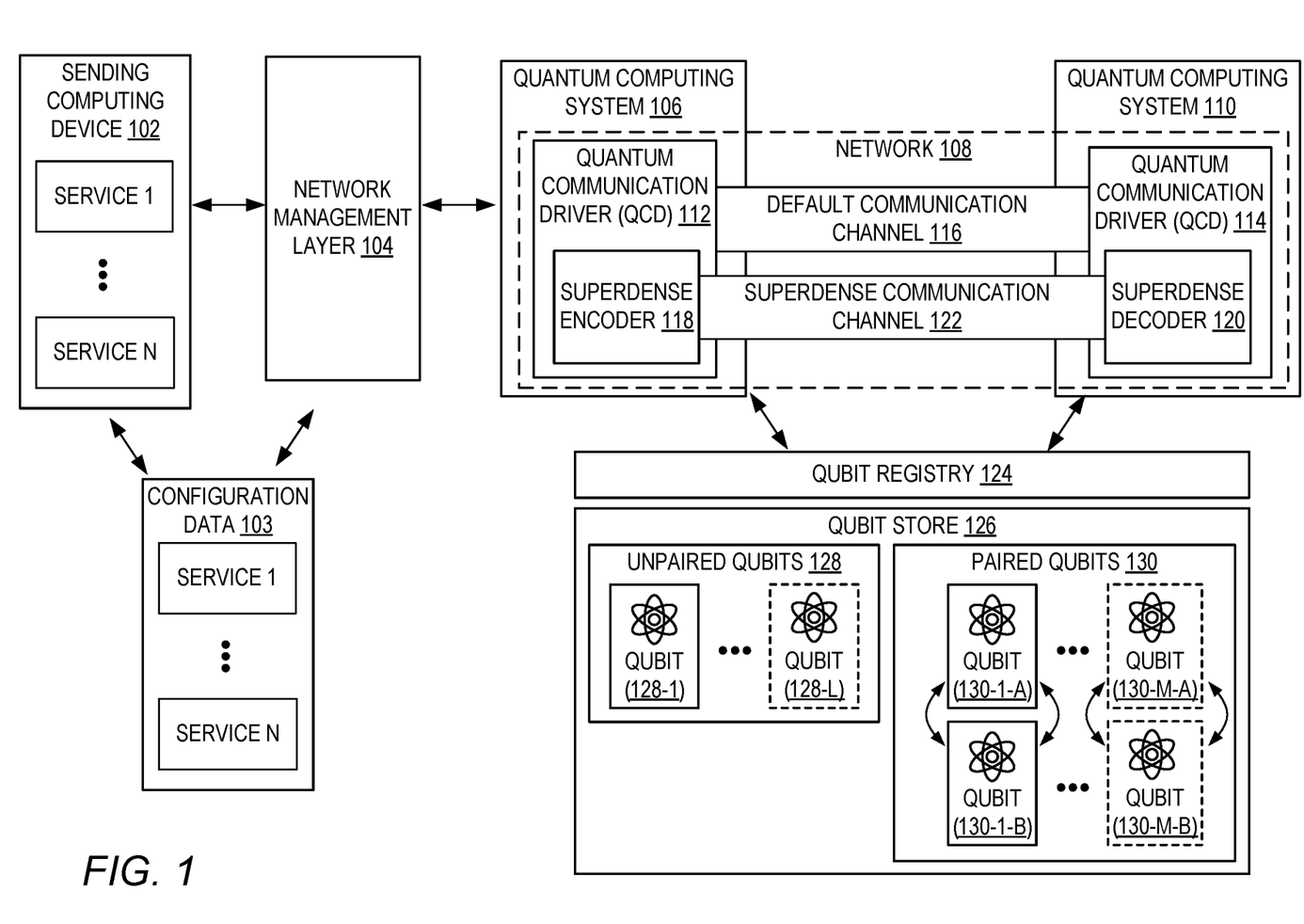
FIG. 1 depicts a system according to examples of the present disclosure.

FIG. 1 is a block diagram of an environment for implementing an example quantum computing networking system according to the present disclosure. A sending computing device 102 can execute one or multiple services (e.g., service 1, . . . , service N, etc.). The sending computing device 102 can output communication packet(s) from the service(s) for transmission over a quantum network. Based on configuration data 103 associated with the service(s), a network management layer 104 can receive the communication packet(s) and instruct the quantum computing system 106 to communicate the packet(s) over a quantum network 108 to a recipient quantum computing system 110.

The network 108 can include a sending quantum communication driver (QCD) 112 and a receiving QCD 114. The QCDs can drive the transmission and receipt of qubits over a default communication channel 116. The QCDs can respectively execute a superdense encoder 118 and a superdense decoder 120 to drive transmission and receipt of qubits over a superdense communication channel 122 (e.g., for reduced bandwidth usage). Transmission and receipt of qubits can occur via fiber optic cables, laser pulses, etc.

The quantum computing systems 106, 110 can access and deposit qubits as needed through a qubit registry 124 organizing a qubit store 126. Qubit store 126 can store unpaired qubits 128 (e.g., qubits 128-1 to 128-L). Unpaired qubits 128 can be used, for instance, for communicating via the default communication channel 116. Qubit store 126 can store paired qubits 130 (e.g., paired qubits 130-1-A and 130-1-B, . . . , paired qubits 130-M-A and 130-M-B, etc.). Paired qubits 130 can be used, for instance, for communicating via the superdense communication channel 122.

The sending computing device 102 can be any type of computing device. The sending computing device 102 can be a quantum computing device or a classical computing device. Example computing devices are discussed with respect to FIG. 4 and FIG. 5.

The services executing on the sending computing device 102 can be any type of computing program or service. For instance, the services can be classical computing services or quantum computing services. The services can generate, relay, or receive data. The services can communicate data in packets. A data packet can include one or more bits of data for communication (e.g., classical bits, qubits, etc.).

Configuration data 103 can contain configuration schema for network communications associated with the services. For instance, configuration data 103 can include configuration files, entries, or other records respectively associated with one or more of the services. Configuration data 103 can specify one or more customizable parameters for network communications with the services. Customizable parameters can include network protocols and instructions for transmitting the communication packets.

Configuration data 103 can configure network communications on a per-service basis. Configuration data 103 can include individual configuration records for each of a plurality of services. Configuration data 103 can include grouped configuration records that can be applied to multiple of a plurality of services.

Network management layer 104 can process communication packets from the sending computing device 102. Network management layer 104 can determine a source of a packet and retrieve, from configuration data 103, configuration parameters for the packet. Based on the configuration parameters, network management layer 104 can pass instructions to the quantum computing system 106 for communication of the data packets over the network 108.

For example, based on the configuration data, the network management layer 104 can cause the quantum computing system 106 to use a particular communication protocol for a communication packet for a particular service. For instance, the network management layer 104 can cause the quantum computing system 106 to communicate the packets over a default communication channel 116 using a default communication protocol. The network management layer 104 can cause the quantum computing system 106 to communicate the packets over a superdense communication channel 122 using a superdense protocol.

Configuration data 103 can provide one or more rules or heuristics for determining a communication protocol and channel for an associated communication packet. The rules or heuristics can include thresholds for triggering failover from the default communication channel 116 to the superdense communication channel 122. The thresholds can include bandwidth thresholds determined on the basis of a total throughput of a given channel, a minimum maintained throughput, a target average throughput, etc. For instance, a first service can be associated with a first threshold value. A second service can be associated with a second threshold value. The first and second threshold values can correspond to bandwidth amounts for throughput of the default communication channel. For instance, when network traffic in the default communication channel surpasses the first threshold, then any traffic from the first service can be diverted to the superdense communication channel. Similarly, when network traffic in the default communication channel surpasses the second threshold, then any traffic from the second service can be diverted to the superdense communication channel. For instance, the traffic from the respective services can be diverted based on the thresholds to preserve or maintain an amount of available bandwidth. For instance, the first service can be associated with a given bandwidth requirement. The first threshold can be set such that the given bandwidth requirement can be satisfied without overtaxing the communication channel in view of the other traffic. For instance, the first threshold can be set to 80% for a first service bandwidth requirement of 20%. The second threshold can be set to 70% for a second service bandwidth requirement of 30%. It is to be understood that any threshold can be set as desired.

Configuration data 103 can also include priority flags or other triggers. For instance, configuration data 103 can include configuration schema for the first service to communicate over the superdense channel for any communication packets for the first service. For instance, the first service can be prioritized such that it is automatically routed to the superdense communication channel.

Configuration data 103 can also include other conditional parameters. For instance, configuration data 103 can generally specify one or more conditions that, when detected, trigger the use of superdense communication channel 122 in lieu of a default communication channel 116.

Configuration data 103 can also include other parameters specifying other configuration details. For instance, configuration data 103 can specify an amount or proportion of data from a communication packet to be diverted to the superdense communication channel 122. Configuration data 103 can specify a type of data from the service to be diverted to the superdense communication channel 122. Configuration data 103 can specify temporal characteristics associated with the satisfaction of the triggers, such as a time interval that the detected condition must be present before triggering the associated response, a time interval after the triggering condition disappears during which the diversion is maintained, etc.

Network management layer 104 can store configuration data 103. Sending computing device 102 can store configuration data 103. Quantum computing systems 106 or 110 can store configuration data 103.

Communication packets from service(s) can include or point to configuration data 103. Network management layer 104 can retrieve configuration data 103 by parsing communication packets and determining a corresponding service for performing a lookup operation against configuration data 103.

Quantum computing system 106 or quantum computing system 110 can operate in quantum environments but can be capable of operating using classical computing principles or quantum computing principles. When using quantum computing principles, the quantum computing system 106 can perform computations that use quantum-mechanical phenomena, such as superposition and/or entanglement states. The quantum computing system 106 can operate under certain environmental conditions, such as at or near zero degrees (0°) Kelvin. When using classical computing principles, the quantum computing system 106 can use binary digits that have a value of either zero (0) or one (1).

Quantum computing system 106 or quantum computing system 110 can interact with the qubit registry 124 to obtain qubits from the qubit store 126. The qubit store 126 can be part of the quantum computing system 106. The qubit store 126 can be part of a different quantum computing system, such as quantum computing system 110. The qubit store 126 can be operated by a third party qubit provider. The qubit store 126 can communicate with quantum computing system 106 or quantum computing system 110 over a quantum network (e.g., network 108).

Quantum computing system 106 and quantum computing system 110 can operate on paired or unpaired qubits. For example, qubits 128-1, 128-L, 130-1-A&B, 130-M-A&B, etc. can each have properties that differ from those of classical (e.g., non-quantum) bits used in classical computing. Each qubit can encode quantum information for an underlying particle such as an atom or a photon and may possess characteristics that differ from those of classical (e.g., non-quantum) bits used in classical computing. For example, while a classical bit can be in a state of either one (1) or zero (0), each qubit can be in a "superposition" of both states simultaneously. Qubits can also experience a physical phenomenon referred to as "entanglement," in which the quantum state of each qubit may not be described independently of the state of another qubit. One application for the phenomenon of entanglement is quantum "teleportation" of a qubit. As used herein, teleportation refers to a process in which an entangled pair of qubits may be used to transmit quantum state information for a payload qubit (e.g., a qubit to be teleported) from one location to another, without having to transmit the payload qubit's underlying particle.

To maintain information for the qubits, the qubit registry 124 can include a plurality of qubit registry entries each corresponding to a qubit, such as unpaired qubits 128 or paired qubits 130. The qubit registry 124 can maintain and provide access to data relating to the qubits implemented by the quantum computing system 106 or the quantum computing system 110, such as a count of the total number of qubits implemented by or allocated to the quantum computing system 106 or the quantum computing system 110 and a count of the number of available qubits that are currently available for allocation ("qubit resource allocation"), as non-limiting examples.

Each of the entries of the qubit registry 124 can also store qubit metadata for a corresponding qubit. The qubit metadata can include, as non-limiting examples, an identifier of the corresponding qubit, an availability indicator that indicates whether the corresponding qubit is available for use or is in use by a specific quantum service, an identifier of a quantum service that is associated with the corresponding qubit or to which the corresponding qubit is allocated, and/or an entanglement indicator that indicates whether the corresponding qubit is in an entangled state. Example details concerning an example of a quantum computing system are discussed with respect to FIG. 4 and FIG. 5.

Examples discussed herein relate to network optimization using quantum communication drivers 112 and 114 configured for implementing superdense encoding. Superdense encoding can allow two classical bits of information to be transmitted from a sender to a recipient by sending only one qubit from the sender to the recipient. To use superdense encoding, the sender and the recipient each possess one qubit of a pair of entangled qubits. The sender can then encode two classical bits of information by manipulating the sender's entangled qubit (e.g., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient (e.g., in the form of photons transmitted via fiber optic cabling or through free space using pulsed lasers, as non-limiting examples), the recipient can then perform measurements on the pair of entangled qubits to decode the two classical bits of information.

Superdense encoding can be leveraged to decrease the number of data bits transmitted via a communications network by half, and as a result may offer benefits in terms of network optimization and bandwidth management, particularly when designing cloud-based service architectures. Superdense encoding may prove especially beneficial for services that have a sensitivity to network availability.

For instance, QCD 112 or QCD 114 can induce an entangled state between each qubit of one or more unpaired qubits 128. The one or more unpaired qubits 128 can be co-located or located in different locations. The one or more unpaired qubits 128 can be distributed to any destinations before or after being entangled in a pair. Inducing the entangled state can be performed, e.g., using Quantum Assembly (QASM) files to apply a Hadamard gate to each of one or more qubits to place them a state of superposition, and then apply a CNOT gate to each of one or more other qubits, as a non-limiting example.

Additionally, or alternatively, QCD 112 or QCD 114 can access a pre-entangled pairing from paired qubits 130. For instance, qubit store 126 can maintain a collection of paired qubits 130 that are maintained in an entangled state. Qubit registry 124 can maintain a listing of entanglement relations between qubits in the qubit store 126.

QCD 112 or QCD 114 can access qubit pairs. For instance, "A" qubits of an A/B pair (e.g., qubit 130-1-A and qubit 130-1-B) can be available to QCD 112 for manipulation by superdense encoder 118 to encode data. "B" qubits can be available to QCD 114 to, under the superdense protocol, obtain additional information via the entanglement pathway. "B" qubits can be distributed to QCD 114 from the qubit store 126 concurrently with, in advance of, or after distribution of "A" qubits to QCD 112. "B" qubits can be distributed to QCD 114 from the qubit store 126 concurrently with, in advance of, or after encoded "A" qubits are transmitted by QCD 112 via the superdense communication channel 122. QCD 112 or QCD 114 can access qubits via remote computing systems (e.g., one or more network-connected quantum computing systems can access qubits on behalf of QCD 112 or QCD 114 in lieu of distributing the qubits to QCD 112 or QCD 114).

In an example, QCD 112 can receive instructions to communicate a data packet over superdense communication channel 122. QCD 112 can cause superdense encoder 118 to encode data from the data packet into an "A" qubit of a paired set of qubits. For instance, superdense encoder 118 can transform a Bell state of the "A" qubit. After performing the superdense encoding, QCD 112 can transmit the "A" qubit to the recipient interface, QCD 114, over superdense communication channel 122. Superdense decoder 120 can leverage the entangled "B" qubit to extract the data packet that was encoded by the superdense encoder 118.

Superdense communication channel 122 can operate in parallel with default communication channel 116. Superdense communication channel 122 can communicate some qubits encoding a data packet for a service while default communication channel 116 can communicate other qubits encoding another data packet for the service.

Superdense communication channel 122 can use the same or different physical infrastructure as default communication channel 116. For instance, superdense communication channel 122 can use the same fiber optic cables or pulsed laser equipment as default communication channel 116. Superdense communication channel 122 can use different fiber optic cables or pulsed laser equipment as default communication channel 116.

It is to be understood that operations described as performed by a particular component, operator, or system can be performed or attributed to, within the scope of the present disclosure, in various implementations, various other components, operators, or systems. For instance, any operations described as (for the sake of illustration) performed by any one or more of the sending computing device 102, network management layer 104, network 108, QCD 112, QCD 114, superdense encoder 118, superdense decoder 120, qubit registry 124, qubit store 126, etc., can be performed by or attributed to any one or more of quantum computing system 106 or quantum computing system 110, all while remaining within the scope of the present disclosure.

Figure 2:
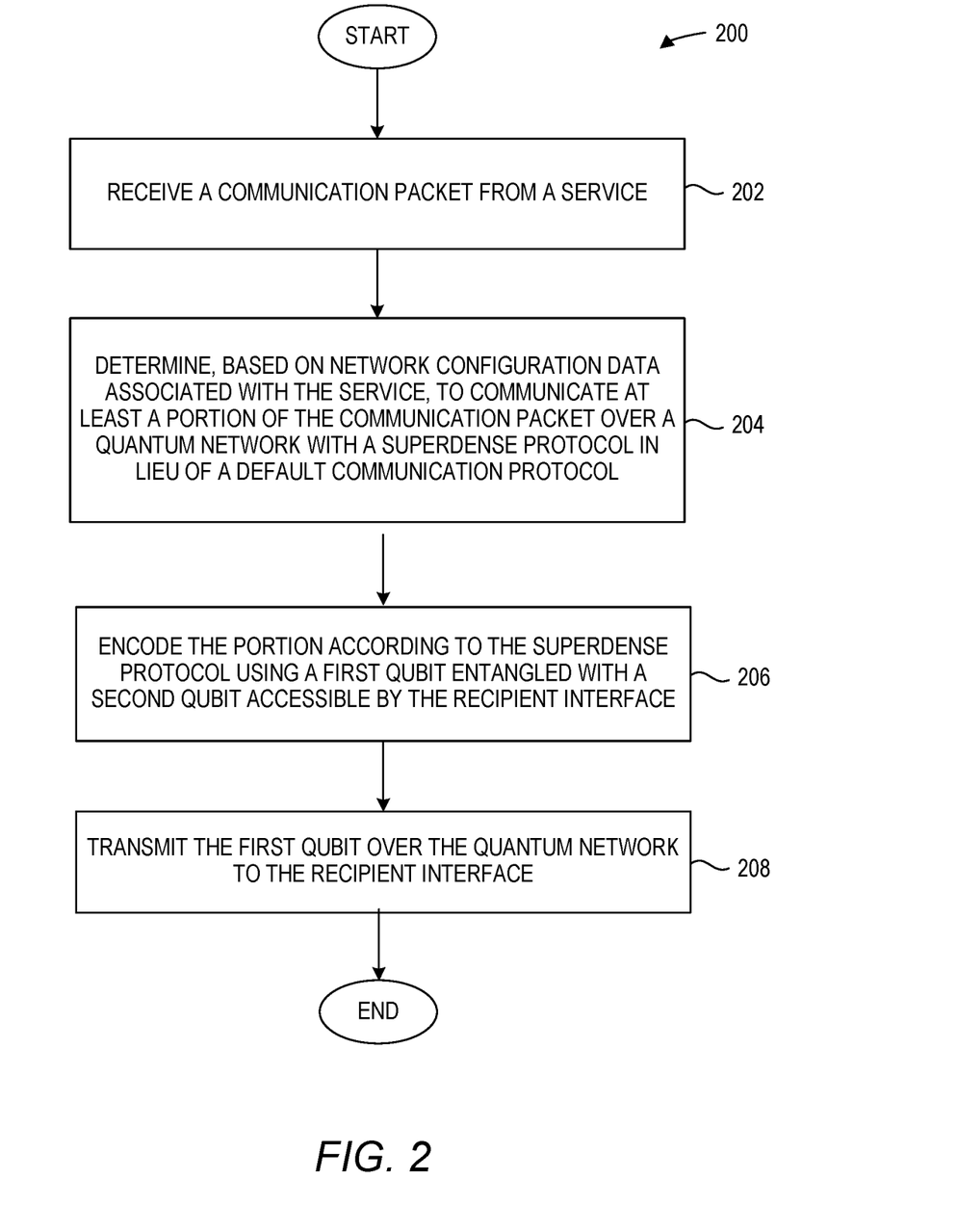
FIG. 2 depicts a flow chart of a method according to examples of the present disclosure.

FIG. 2 is a flow chart 200 of an example method according to example implementations of the present disclosure. FIG. 2 may be implemented using one or more computing devices, such as computing device 2 of FIG. 4, quantum computing device 50 of FIG. 5, etc. Elements of FIG. 1 are referenced in describing FIG. 2 for the sake of clarity. It is to be understood that, in some examples, some operations illustrated in FIG. 2 may be performed in an order other than illustrated herein, include operations not illustrated, or may be omitted.

At 202, the example method can include receiving a communication packet from a service. For example, a quantum computing system (e.g., quantum computing system 106) can receive a communication packet from a service 1 of a plurality of services executing on a sending computing device 102. The communication packet can optionally pass through or be relayed by a network management layer 104 which can perform routing of the packet.

At 204, the example method can include determining, based on network configuration data associated with the service, to communicate at least a portion of the communication packet over a quantum network with a superdense protocol in lieu of a default communication protocol. For example, configuration data 103 can include network configuration data. Configuration data 103 can store network configuration data in association with one or more services. Configuration data 103 can store independently customizable configurations for each respective service. For example, quantum computing system 106 can determine based on the network configuration data associated with the service to communicate the packet (or a portion thereof) over the superdense communication channel 122 instead of the default communication channel 116.

At 206, the example method can include encoding the portion according to the superdense protocol using a first qubit entangled with a second qubit accessible by the recipient interface. For instance, a superdense encoder 118 of a quantum computing system 106 can manipulate a first qubit 130-1-A that is entangled with a second qubit 130-1-B. The superdense encoder 118 can perform operations on the first qubit 130-1-A to transform a Bell state. The second qubit 130-1-B can be accessible by the recipient interface, which can be a quantum computing system (e.g., quantum computing system 110). For instance, the second qubit 130-1-B can be distributed to quantum computing system 110 in advance.

At 208, the example method can include transmitting the first qubit over the quantum network to the recipient interface. For instance, first qubit 130-1-A can be transmitted over the quantum network to quantum computing system 110.

In some examples, the example method can include determining, by the quantum computing system and based on a priority status for the service indicated by the network configuration data, to communicate the portion with the superdense protocol. For instance, configuration data 103 can include a priority status indicator for one or more services. Communication packets from those one or more services can be routed for transmission via the superdense protocol based on their priority status.

In some examples, the example method can include determining, by the quantum computing system and based on a bandwidth demand for the service indicated by the network configuration data, to communicate the portion with the superdense protocol. For instance, configuration data 103 can indicate an amount of bandwidth usage associated with the service.

In some examples of the example method, the network configuration data comprises a bandwidth threshold associated with the service, the bandwidth threshold indicating a threshold bandwidth status of the quantum network, responsive to which communication packets from the service are to be communicated using the superdense protocol. For instance, configuration data 103 can indicate a threshold utilization of available network link bandwidth that triggers failover into the superdense channel in order to preserve a desired utilization of the network link.

In some examples, the example method can include receiving, by the quantum computing system and from the recipient interface, a request for a communication packet from the service. In some examples, the example method can include, responsive to receiving the request, determining, by the quantum computing system and based on network configuration data associated with the service, to communicate the portion over the quantum network with the superdense protocol in lieu of the default communication protocol. For instance, communication via the superdense communication channel 122 can be triggered based on inbound signals, such as inbound messages from external sources (e.g., quantum computing system 110).

In some examples, the example method can include receiving, by the quantum computing system, the communication packet through an application programming interface configured to receive inbound communication packets for communication over the quantum network. For instance, a computing system (e.g., classical computing system, quantum computing system) can provide an API for transmitting data over the quantum network. For instance, the API can interface with one or more connected computing systems (e.g., over a local network, the internet) to facilitate quantum communications. The API can automatically route traffic via the default communication channel 116 or the superdense communication channel 122 (e.g., based on configuration data 103).

In some examples, the example method can include communicating, by the quantum computing system, and in parallel with communicating the portion, at least a portion of a different communication packet from a different service over the quantum network with the default communication protocol.

Figure 3:
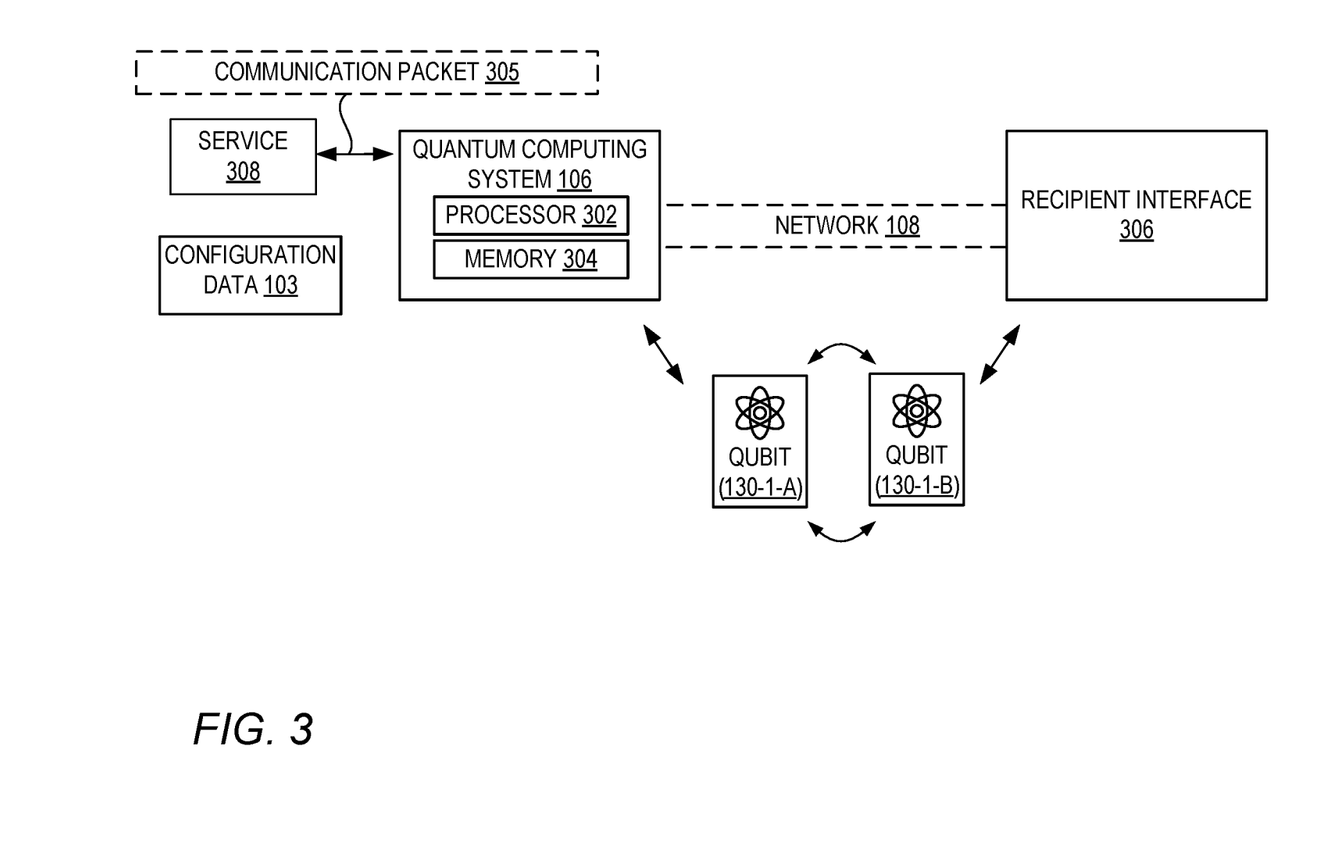
FIG. 3 depicts a system according to examples of the present disclosure.

FIG. 3 depicts a simplified diagram of a quantum computing system 106 having a processor 302 and a memory 304. The processor 302 can be communicatively coupled to memory 304 to receive a communication packet 305 from a service 308. The processor 302 can be communicatively coupled to memory 304 to determine, based on network configuration data 103 associated with the service 308, to communicate at least a portion of the communication packet 305 over a quantum network 108 with a superdense protocol in lieu of a default communication protocol. The processor 302 can be communicatively coupled to memory 304 to encode the portion according to the superdense protocol using a first qubit 130-1-A entangled with a second qubit 130-1-B accessible by the recipient interface 306. The processor 302 can be communicatively coupled to memory 304 to transmit the first qubit 130-1-A over the quantum network 108 to the recipient interface 306.

Figure 4:
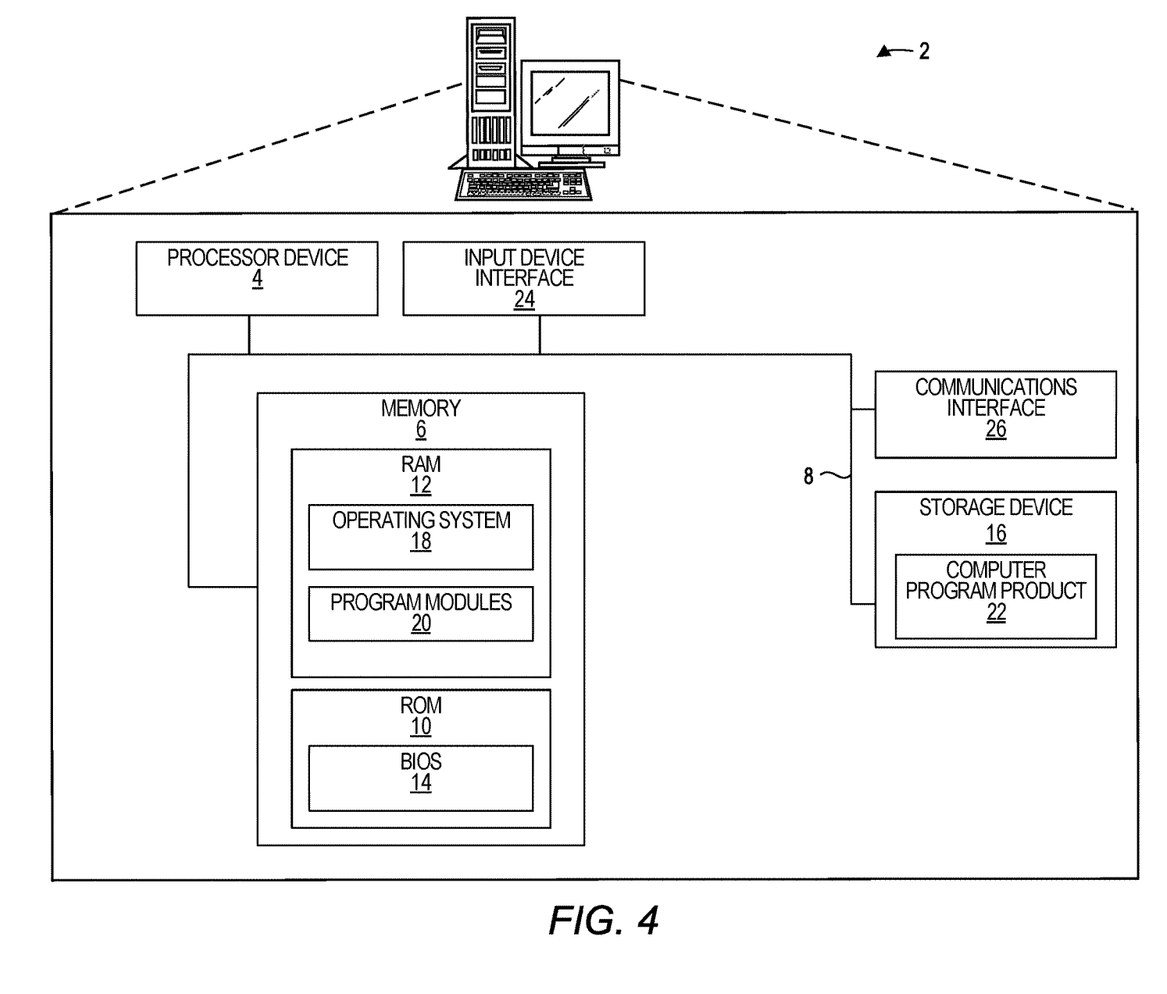
FIG. 4 depicts an example computing device to implement examples according to the present disclosure.

FIG. 4 is a block diagram of the computing device 2 suitable for implementing examples. FIG. 4 is representative of computing device 2 for purposes of illustration. FIG. 4 may also be representative of other computing devices that may be used in conjunction with examples. The computing device 2 may comprise any computing or electronic device capable of including firmware, hardware, and/or executing software instructions to implement the functionality described herein, such as a computer server, a desktop computing device, a laptop computing device, or the like. The computing device 2 includes the processor device 4, the memory 6, and a system bus 8. The system bus 8 provides an interface for system components including, but not limited to, the memory 6 and the processor device 4. The processor device 4 may be any commercially available or proprietary processor.

The memory 6 may include non-volatile memory 10 (e.g., read-only memory (ROM), erasable programmable read-only memory (EPROM), electrically erasable programmable read-only memory (EEPROM), etc.), and volatile memory 12 (e.g., random-access memory (RAM)). A basic input/output system (BIOS) 14 may be stored in the non-volatile memory 10 and may include the basic routines that help to transfer information between elements within the computing device 2. The volatile memory 12 may also include a high-speed RAM, such as static RAM, for caching data.

The computing device 2 may further include or be coupled to a non-transitory computer-readable storage medium such as the storage device 16, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 16 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A few modules may be stored in the storage device 16 and in the volatile memory 12, including an operating system 18 and one or more program modules 20 which may implement the functionality described herein in whole or in part (e.g., network management layer 104, an API for interfacing with quantum computing systems 106, 110, etc., qubit registry 124, configuration data 103, etc.).

All or a portion of the examples may be implemented as a computer program product 22 stored on a transitory or non-transitory computer-usable or computer-readable storage medium, such as the storage device 16, which includes complex programming instructions, such as complex computer-readable program code, to cause the processor device 4 to carry out the steps described herein. Thus, the computer-readable program code may comprise software instructions for implementing the functionality of the examples described herein when executed on the processor device 4. The processor device 4, coupled to the memory 6 for implementing the instructions stored thereon, may serve as a controller, or control system, for the computing device 2 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 4 through an input device interface 24 that is coupled to the system bus 8 but may be connected by other interfaces such as a parallel port, an Institute of Electrical and Electronic Engineers (IEEE) 1394 serial port, a Universal Serial Bus (USB) port, an IR interface, and the like.

The computing device 2 may also include a communications interface 26 suitable for communicating with a network or other devices as appropriate or desired.

Figure 5:
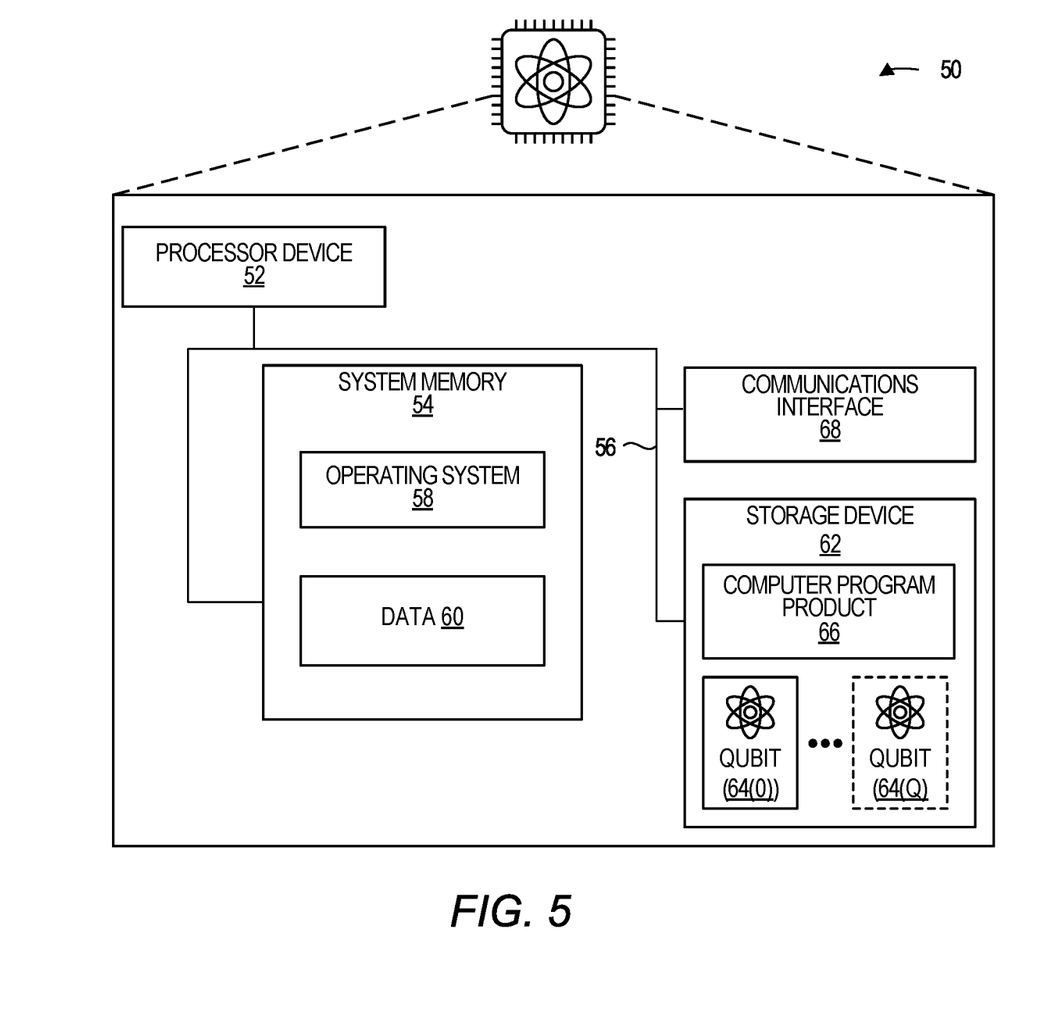
FIG. 5 depicts an example quantum computing system to implement examples according to the present disclosure.

FIG. 5 is a block diagram of a quantum computing device 50 suitable for implementing examples according to example implementations. The quantum computing device 50 may comprise any computing or electronic device capable of including firmware, hardware, and/or executing software instructions to implement the functionality described herein in a quantum environment.

The quantum computing device 50 may include one or more quantum processor device(s) 52, one or more memory device(s) 54 and/or a system bus 56. The system bus 56 provides an interface for system components including, but not limited to, the one or more memory device(s) 54 and the one or more quantum processor device(s) 52. The one or more quantum processor device(s) 52 may be any commercially available or proprietary processor suitable for operating in a quantum environment and may include a combination of quantum processors (e.g., having one or more qubits) and classical processors. The one or more memory device(s) 54 may store computer-readable instructions associated with an operating system 58. The one or more memory device(s) 54 may store computer-readable instructions for implementing examples according to the present disclosure. The one or more memory device(s) 54 may store data 60.

The quantum computing device 50 may further include or be coupled to a non-transitory computer-readable storage medium such as a storage device 62. The storage device 62 and other drives associated with computer-readable media and computer-usable media may provide non-volatile storage of data, data structures, computer-executable instructions, and the like. The storage device 62 may also store one or more qubits 64(0)-64(Q) which may be measured or manipulated by the one or more quantum processor device(s) 52 when performing quantum computing operations.

All or a portion of the examples may be implemented as a computer program product 66 stored on a transitory or non-transitory computer-usable or computer-readable storage medium, such as the storage device 62, which includes complex programming instructions, such as complex computer-readable program code, to cause the one or more processor devices 52 to carry out the functionality described herein. Thus, the computer-readable program code may comprise software instructions for implementing the functionality of the examples described herein when executed on the one or more processor devices 52.

An operator may also be able to enter one or more configuration commands through a keyboard (not illustrated), a pointing device such as a mouse (not illustrated), or a touch-sensitive surface (not illustrated). The quantum computing device 50 may also include a communications interface 68 suitable for communicating with other computing devices, including, in some implementations, classical computing devices and/or quantum computing devices.

Individuals will recognize improvements and modifications to the preferred examples of the disclosure. All such improvements and modifications are considered within the scope of the concepts disclosed herein and the claims that follow.

What is claimed is:

1. A method comprising:
   receiving, by a quantum computing system comprising a processor device, a communication packet from a service of a plurality of services;
   accessing, by the quantum computing system, network configuration data corresponding to the plurality of services, wherein the network configuration data is descriptive of one or more attributes of the service of the plurality of services, wherein each of the one or more attributes is associated with a corresponding threshold value;
   determining, by the quantum computing system and based on an attribute of the one or more attributes of the service exceeding the threshold value that corresponds to the attribute, to communicate at least a portion of the communication packet over a quantum network with a superdense protocol in lieu of a default communication protocol;
   encoding, by the quantum computing system, the at least the portion according to the superdense protocol using a first qubit entangled with a second qubit accessible by a recipient interface; and
   transmitting, by the quantum computing system, the first qubit over the quantum network to the recipient interface.

2. The method of claim 1, wherein the attribute comprises a priority status for the service, and wherein the method comprises:
   determining, by the quantum computing system and based on the priority status for the service indicated by the network configuration data, to communicate the at least the portion with the superdense protocol.

3. The method of claim 1, wherein the attribute comprises a bandwidth demand for the service, and wherein the method further comprises:
   determining, by the quantum computing system and based on the bandwidth demand for the service indicated by the network configuration data, to communicate the at least the portion with the superdense protocol.

4. The method of claim 1, wherein the network configuration data comprises a bandwidth threshold associated with the service, the bandwidth threshold indicating a threshold bandwidth status of the quantum network, responsive to which communication packets from the service are to be communicated using the superdense protocol.

5. The method of claim 1, comprising:
receiving, by the quantum computing system and from the recipient interface, a request for a communication packet from the service; and
responsive to receiving the request, determining, by the quantum computing system and based on the network configuration data, to communicate the at least the portion over the quantum network with the superdense protocol in lieu of the default communication protocol.

6. The method of claim 1, comprising:
receiving, by the quantum computing system, the communication packet through an application programming interface configured to receive inbound communication packets for communication over the quantum network.

7. The method of claim 1, comprising:
communicating, by the quantum computing system, and in parallel with communicating the at least the portion, at least a portion of a different communication packet from a different service over the quantum network with the default communication protocol.

8. A quantum computing system, comprising:
a memory; and
a processor device coupled to the memory to:
receive a communication packet from a service of a plurality of services;
access network configuration data corresponding to the plurality of services, wherein the network configuration data is descriptive of one or more attributes of the service of the plurality of services, wherein each of the one or more attributes is associated with a corresponding threshold value;
determine, based on an attribute of the one or more attributes of the service exceeding the threshold value that corresponds to the attribute, to communicate at least a portion of the communication packet over a quantum network with a superdense protocol in lieu of a default communication protocol;
encode the at least the portion according to the superdense protocol using a first qubit entangled with a second qubit accessible by a recipient interface; and
transmit the first qubit over the quantum network to the recipient interface.

9. The quantum computing system of claim 8, wherein the attribute comprises a priority status for the service, and wherein the processor device coupled to the memory is further to:
determine, based on the priority status for the service indicated by the network configuration data, to communicate the at least the portion with the superdense protocol.

10. The quantum computing system of claim 8, wherein the attribute comprises a bandwidth demand for the service, and wherein the processor device coupled to the memory is further to:
determine, based on the bandwidth demand for the service indicated by the network configuration data, to communicate the at least the portion with the superdense protocol.

11. The quantum computing system of claim 8, wherein the network configuration data comprises a bandwidth threshold associated with the service, the bandwidth threshold indicating a threshold bandwidth status of the quantum network, responsive to which communication packets from the service are to be communicated using the superdense protocol.

12. The quantum computing system of claim 8, the processor device coupled to the memory to:
receive, from the recipient interface, a request for a communication packet from the service; and
responsive to receiving the request, determine, based on the network configuration data, to communicate the at least the portion over the quantum network with the superdense protocol in lieu of the default communication protocol.

13. The quantum computing system of claim 8, the processor device coupled to the memory to:
receive the communication packet through an application programming interface configured to receive inbound communication packets for communication over the quantum network.

14. The quantum computing system of claim 8, the processor device coupled to the memory to:
communicate, in parallel with communicating the at least the portion, at least a portion of a different communication packet from a different service over the quantum network with the default communication protocol.

15. A non-transitory computer-readable storage medium that comprises executable instructions to cause a quantum computing system to:
receive a communication packet from a service of a plurality of services;
access network configuration data corresponding to the plurality of services, wherein the network configuration data is descriptive of one or more attributes of the service of the plurality of services, wherein each of the one or more attributes is associated with a corresponding threshold value;
determine, based on an attribute of the one or more attributes of the service exceeding the threshold value that corresponds to the attribute, to communicate at least a portion of the communication packet over a quantum network with a superdense protocol in lieu of a default communication protocol;
encode the at least the portion according to the superdense protocol using a first qubit entangled with a second qubit accessible by a recipient interface; and
transmit the first qubit over the quantum network to the recipient interface.

16. The non-transitory computer-readable storage medium of claim 15, wherein the attribute comprises a priority status for the service, and wherein the executable instructions further cause the quantum computing system to:
determine, based on the priority status for the service indicated by the network configuration data, to communicate the at least the portion with the superdense protocol.

17. The non-transitory computer-readable storage medium of claim 15, wherein the attribute comprises a bandwidth demand for the service, and wherein the executable instructions further cause the quantum computing system to:
determine, based on the bandwidth demand for the service indicated by the network configuration data, to communicate the at least the portion with the superdense protocol.

18. The non-transitory computer-readable storage medium of claim 15, wherein the network configuration data comprises a bandwidth threshold associated with the service, the bandwidth threshold indicating a threshold bandwidth status of the quantum network, responsive to which communication packets from the service are to be communicated using the superdense protocol.

19. The non-transitory computer-readable storage medium of claim 15, executable instructions further cause the quantum computing system to:
- receive, from the recipient interface, a request for a communication packet from the service; and
- responsive to receiving the request, determine, based on the network configuration data, to communicate the at least the portion over the quantum network with the superdense protocol in lieu of the default communication protocol.

20. The non-transitory computer-readable storage medium of claim 15, wherein the executable instructions further cause the quantum computing system to:
- receive the communication packet through an application programming interface configured to receive inbound communication packets for communication over the quantum network.

* * * * *